(12) United States Patent
Chen

(10) Patent No.: US 9,141,503 B1
(45) Date of Patent: Sep. 22, 2015

(54) VEHICLE-SPECIFIC DIAGNOSTIC RESET DEVICE AND METHOD

(71) Applicant: Innova Electronics, Inc., Irvine, CA (US)

(72) Inventor: Ieon C. Chen, Laguna Hills, CA (US)

(73) Assignee: Innova Electronics, Inc., Irvine, CA (US)

( * ) Notice: Subject to any disclaimer, the term of this patent is extended or adjusted under 35 U.S.C. 154(b) by 0 days.

(21) Appl. No.: 14/502,911

(22) Filed: Sep. 30, 2014

(51) Int. Cl.
*G06F 11/30* (2006.01)
*G21C 17/00* (2006.01)

(52) U.S. Cl.
CPC ............... *G06F 11/30* (2013.01); *G21C 17/00* (2013.01)

(58) Field of Classification Search
USPC .......................................................... 701/33.4
See application file for complete search history.

(56) References Cited

U.S. PATENT DOCUMENTS

| | | |
|---|---|---|
| D334,560 S | 4/1993 | Wilson |
| 5,347,211 A | 9/1994 | Jakubowski |
| D377,622 S | 1/1997 | Chen |
| 5,635,841 A | 6/1997 | Taylor |
| 5,758,300 A | 5/1998 | Abe |
| 5,767,681 A | 6/1998 | Huang |
| 5,809,437 A | 9/1998 | Breed |
| 5,859,628 A | 1/1999 | Ross et al. |
| 5,884,202 A | 3/1999 | Arjomand |
| 6,000,413 A | 12/1999 | Chen |
| 6,055,468 A | 4/2000 | Kaman et al. |
| 6,094,609 A | 7/2000 | Arjomand |
| 6,169,943 B1 | 1/2001 | Simon et al. |
| 6,225,898 B1 | 5/2001 | Kamiya et al. |
| 6,263,268 B1 | 7/2001 | Nathanson |
| 6,389,337 B1 | 5/2002 | Kolls |
| 6,438,471 B1 | 8/2002 | Katagishi et al. |
| 6,499,385 B2 | 12/2002 | Protti |
| 6,535,112 B1 | 3/2003 | Rothshink |
| 6,587,768 B2 | 7/2003 | Chene et al. |
| 6,611,740 B2 | 8/2003 | Lowrey et al. |
| 6,650,318 B1 | 11/2003 | Arnon |
| 6,718,425 B1 | 4/2004 | Pajakowski et al. |
| 6,732,031 B1 | 5/2004 | Lightner et al. |
| 6,807,469 B2 | 10/2004 | Funkhouser et al. |
| 6,836,708 B2 | 12/2004 | Tripathi |

(Continued)

FOREIGN PATENT DOCUMENTS

WO     WO 0186576     11/2001

*Primary Examiner* — Thomas Tarcza
*Assistant Examiner* — Alex C Dunn
(74) *Attorney, Agent, or Firm* — Stetina Brunda Garred & Brucker (57) ABSTRACT

There is provided a device, system, and method for generating vehicle-specific diagnostic reset procedures using a data signal representative of vehicle identifying information. Diagnostic reset procedures corresponding to a vehicle are generated in response to converting vehicle identifying information into a data signal representative of the vehicle's VIN or license plate number, and matching the data signal with corresponding diagnostic reset procedures stored in a diagnostic reset procedure database. The vehicle-specific diagnostic reset procedures may be displayed on a mobile communication device, such as a smart phone, for instructing the user to manually perform the corresponding diagnostic reset procedures. Alternatively, the corresponding diagnostic reset procedures may be communicated directly to the vehicle's electronic control unit for electronically implementing the corresponding diagnostic reset procedures.

21 Claims, 4 Drawing Sheets

(56) References Cited

U.S. PATENT DOCUMENTS

| | | | |
|---|---|---|---|
| 6,847,916 B1 | 1/2005 | Ying | |
| 6,868,369 B2 | 3/2005 | Huang | |
| 6,925,368 B2 | 8/2005 | Funkhouser et al. | |
| 6,940,270 B2 | 9/2005 | Chen | |
| D510,287 S | 10/2005 | Chen | |
| 6,957,133 B1 | 10/2005 | Hunt et al. | |
| 6,968,733 B2 | 11/2005 | Andreasen | |
| 7,010,416 B2 | 3/2006 | Lewis | |
| 7,030,742 B2 | 4/2006 | Treadway | |
| 7,085,680 B2 | 8/2006 | Huang | |
| 7,116,216 B2 | 10/2006 | Andreasen | |
| 7,124,058 B2 * | 10/2006 | Namaky et al. | 702/183 |
| 7,209,813 B2 | 4/2007 | Namaky | |
| RE39,619 E | 5/2007 | Andreasen | |
| D545,223 S | 6/2007 | Chen | |
| 7,231,292 B2 | 6/2007 | Lewis | |
| D558,621 S | 1/2008 | Rich | |
| D559,137 S | 1/2008 | Protti | |
| D560,129 S | 1/2008 | Rich | |
| D560,527 S | 1/2008 | Rich | |
| 7,325,775 B2 | 2/2008 | Chen | |
| D563,249 S | 3/2008 | Chen | |
| 7,363,149 B2 | 4/2008 | Klausner et al. | |
| D569,280 S | 5/2008 | Chen | |
| 7,376,497 B2 | 5/2008 | Chen | |
| D571,241 S | 6/2008 | Andreasen | |
| 7,437,227 B2 | 10/2008 | Andreasen | |
| D581,822 S | 12/2008 | Madison | |
| 7,464,000 B2 | 12/2008 | Huang | |
| D590,387 S | 4/2009 | Chen | |
| 7,520,668 B2 | 4/2009 | Chen | |
| RE40,798 E | 6/2009 | Chen | |
| RE40,799 E | 6/2009 | Chen | |
| 7,592,903 B2 | 9/2009 | Kochie | |
| 7,603,293 B2 | 10/2009 | Chen | |
| 7,620,484 B1 | 11/2009 | Chen | |
| D610,586 S | 2/2010 | Chen | |
| 7,734,390 B2 | 6/2010 | Chen | |
| 7,739,078 B2 * | 6/2010 | Ferchau | 702/184 |
| 7,778,750 B2 | 8/2010 | Knight et al. | |
| D624,446 S | 9/2010 | Chen | |
| D624,838 S | 10/2010 | Chen | |
| D625,209 S | 10/2010 | Chen | |
| D625,210 S | 10/2010 | Chen | |
| D625,634 S | 10/2010 | Chen | |
| 7,835,691 B2 | 11/2010 | Groskreutz et al. | |
| 7,865,281 B2 | 1/2011 | Iwai et al. | |
| 7,904,219 B1 | 3/2011 | Lowrey et al. | |
| 7,974,750 B2 | 7/2011 | Namaky | |
| 8,019,503 B2 | 9/2011 | Andreasen | |
| 8,024,083 B2 | 9/2011 | Chen | |
| D646,188 S | 10/2011 | Chen | |
| D646,599 S | 10/2011 | Chen | |
| 8,032,419 B2 | 10/2011 | Chen | |
| 8,068,951 B2 | 11/2011 | Chen et al. | |
| 8,301,329 B2 | 10/2012 | Andreasen | |
| 8,306,687 B2 | 11/2012 | Chen | |
| 8,370,018 B2 | 2/2013 | Andreasen et al. | |
| 8,473,145 B2 | 6/2013 | Biswas et al. | |
| 8,509,986 B1 | 8/2013 | Chen | |
| 8,630,765 B2 | 1/2014 | Chen | |
| 8,825,271 B2 | 9/2014 | Chen | |
| 8,831,814 B2 | 9/2014 | Chen | |
| 8,855,621 B2 | 10/2014 | Chen | |
| 8,862,117 B2 | 10/2014 | Chen | |
| 8,880,274 B2 | 11/2014 | Chen | |
| 8,909,416 B2 | 12/2014 | Chen et al. | |
| 2003/0069673 A1 * | 4/2003 | Hong et al. | 701/29 |
| 2003/0171111 A1 | 9/2003 | Clark | |
| 2004/0110472 A1 | 6/2004 | Witkowski | |
| 2004/0215379 A1 | 10/2004 | Pangerl et al. | |
| 2006/0052919 A1 * | 3/2006 | Hong et al. | 701/29 |
| 2008/0228337 A1 * | 9/2008 | Bauerle et al. | 701/29 |
| 2009/0276115 A1 * | 11/2009 | Chen | 701/32 |
| 2010/0332363 A1 * | 12/2010 | Duddle et al. | 705/34 |
| 2011/0224866 A1 | 9/2011 | Chen | |
| 2011/0225096 A1 | 9/2011 | Cho et al. | |
| 2011/0264322 A1 | 10/2011 | Chen | |
| 2012/0215398 A1 | 8/2012 | Chen | |
| 2014/0046800 A1 | 2/2014 | Chen | |
| 2014/0052328 A1 | 2/2014 | Nguyen | |
| 2014/0058619 A1 * | 2/2014 | Kochie | 701/31.4 |

* cited by examiner

VEHICLE-SPECIFIC DIAGNOSTIC RESET DEVICE AND METHOD

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field of the Invention

The present invention relates to a vehicle diagnostic device, and more specifically, a vehicle diagnostic device for accessing vehicle-specific diagnostic reset procedures and communicating vehicle-specific diagnostic reset procedures to a vehicle's electronic control unit.

2. Description of the Related Art

Automotive vehicles are a common means of transportation in regions throughout the world. In this regard, automobiles may be used for local, day-to-day transportation, or for traveling to more far-reaching destinations. Vehicles are sophisticated machines comprised of cooperative electrical, mechanical and fluid components. Although vehicles are designed to operate for long periods of time, routine maintenance and checkup are required for vehicles to reach their maximum operating potential. Diagnostic indicators located on the vehicle's dashboard, or integrated within the vehicle's electronic control unit, may alert the driver that a repair or service is required, or may be required in the near future.

Various devices have been developed to provide a driver/mechanic with objective diagnostic information regarding the health of the vehicle once a driver brings the automobile in for repair. For instance, diagnostic scan tools used to access information maintained in an onboard vehicle computer, to retrieve diagnostic trouble codes therefrom. The diagnostic trouble codes may be uploaded to a diagnostic database for determining a possible diagnostic solution, which a mechanic/driver, may then implement to repair the vehicle.

After the mechanic/driver, has implemented the correct diagnostic solution, the mechanic/driver must reset the diagnostic indicator that initially alerted the driver of a problem with the vehicle. For instance, a diagnostic indicator may illuminate to alert the driver or mechanic of a service requirement. Once the driver has taken the vehicle to a repair shop, the diagnostic indicator located on the vehicle's dashboard will need to be and reset and/or the diagnostic indicator integrated within the vehicle's electronic control unit will need to have its memory erased to turn off the diagnostic indicator.

The specific diagnostic reset procedure for a vehicle varies, but may be identified by reference to the vehicle's characteristic information (i.e., make, model, year, and engine type). Therefore, a mechanic must manually execute a vehicle specific reset procedure, or communicate the vehicle specific procedure to the vehicle's electronic control unit to successfully reset or restore the diagnostic indicator to its original (off) condition. This process typically requires the mechanic to search through various automobile maintenance manuals, booklets, and subscriptions to determine the correct diagnostic reset procedure for the vehicle. This process wastes the time that a mechanic could spend on repairing another automobile and, therefore, also increases the cost to have an automobile repaired.

Recognizing this deficiency, there is a need in the art for a tool readily accessible to a driver/mechanic that can efficiently provide the driver/mechanic with vehicle-specific diagnostic reset procedures for manual implementation on a vehicle, or, alternatively, communicate vehicle-specific diagnostic reset procedures to the vehicle's electronic control unit for electronic implementation. To achieve optimal efficiency, the tool should allow the driver/mechanic to electronically obtain information useful to derive the vehicle identifying information, e.g., by taking a picture of a vehicle's license plate number or vehicle identification number (VIN). Alternatively, the tool may be programmed to obtain the vehicle's VIN, or other vehicle identifying information, directly from the vehicle's electronic control unit. The vehicle identifying information may also be derived from the vehicle's license plate number. The vehicle identifying information may then be used to access the diagnostic reset procedure associated with the vehicle from a suitable database.

One device commonly carried or kept in close proximity to many individuals that has the ability to take pictures and receive information from remote computers is a mobile communication device, such as a smart phone. A smart phone is a programmable, handheld electronic device that is typically capable of communicating with a cellular telephone network and a local wireless network. Smart phones also typically include data processing and display capabilities, which allow smart phones to be used for a wide range of functions beyond simply making phone calls.

A device which utilizes the capabilities of a smart phone may be used to both optically capture, process and/or communicate information useful to derive vehicle identifying information. When used with aa device operative to access a vehicle electronic control unit (ECU), The device may alternatively be used to access information useful to derive vehicle identifying information directly from a vehicle's electronic control unit. The device may then convert the captured optical image, or the information from the vehicle, into a data signal, and upload the data signal to a reset procedure database to access the diagnostic reset procedure for the vehicle. The device may be then used to display the accessed diagnostic reset procedure for manual implementation, or, alternatively, to communicate the accessed diagnostic reset procedure to the vehicle's electronic control unit for electronic implementation. As described below, the present invention addresses these and other improvements to contemporary vehicle diagnostic systems.

BRIEF SUMMARY OF THE INVENTION

There is provided a device, system, and method for generating vehicle-specific diagnostic reset procedures using a data from the vehicle to derive vehicle identifying information. Vehicle specific diagnostic reset procedures may be accessed by using the vehicle identifying information to access a corresponding diagnostic reset procedure stored in a diagnostic reset procedure database. The vehicle-specific diagnostic reset procedure may be displayed on a mobile communication device, such as a smart phone, for instructing the user to manually perform the corresponding diagnostic reset procedures. Alternatively, the diagnostic reset procedure may be communicated to the vehicle's electronic control unit for electronically implementing the corresponding diagnostic reset procedures.

According to one embodiment, there is provided a vehicle diagnostic device for deriving and displaying vehicle-specific diagnostic reset procedures. The device includes an image capturing device for capturing an optical image of a VIN or license plate, and an optical character recognition module in communication with the image capturing device for converting the captured image into a first data signal. The optical character recognition module is in communication with a reset procedure database for communicating the first data signal to the reset procedure database for accessing reset procedures associated with the VIN or license plate number. The device may further include a display module in communication with the reset procedure database for receiving and displaying the diagnostic reset procedures accessed from the reset procedure database. In another embodiment the vehicle diagnostic port may be provided with a local connection circuit, e.g., Wi-Fi or Bluetooth useful to allow the device to communicate with the vehicle electronic control unit, a remotely located optical character recognition device and/or remotely located reset procedure database.

The image capturing device may be a camera that, for example, is disposed in a mobile communication device. The optical character recognition module and display module may also be disposed in the mobile communication device.

The vehicle decoder module may be operative to convert an optical image, e.g. of a license plate, bar code image, or VIN, into a corresponding electronic data signal. The vehicle decoder module may communicate the data signal to the reset procedure database for accessing a diagnostic reset procedure associated therewith. The vehicle decoder module may also be disposed in a mobile communication device.

In another embodiment, there is provided a device for deriving and communicating vehicle-specific diagnostic reset procedures to a vehicle diagnostic port in communication with a vehicle's electronic control unit. The device may be the same as the device described immediately above, but includes a local wireless connectivity circuit that communicates with the vehicle diagnostic port, allowing the vehicle diagnostic device to wirelessly receive data from the vehicle diagnostic port and to communicate the warning light reset procedure accessed from the reset procedure database to a vehicle diagnostic port. The local wireless connectivity circuit may also allow the vehicle diagnostic device to wirelessly receive vehicle identifying information from the vehicle diagnostic port.

According to another embodiment, there is provided a system for deriving and displaying vehicle-specific diagnostic reset procedures on a vehicle diagnostic device. The system includes an image capturing device configured to capture an optical image of vehicle identifying information. The system further includes an optical character recognition module in communication with the image capturing device, wherein the optical character recognition module is configured to convert the captured image into a first data signal representative of the vehicle identifying information. The system further includes a reset procedure database in communication with the optical character recognition module for receiving the first data signal, wherein the reset procedure database stores a plurality of vehicle-specific diagnostic reset procedures, and is operative to access diagnostic reset procedures associated with the vehicle identifying information from the plurality of diagnostic reset procedures. The system may also include a display module in communication with the reset procedure database for displaying the diagnostic reset procedures accessed from the reset procedure database.

The image capturing device may be a camera that may, for example, be disposed in a mobile communication device. The optical character recognition module and display module may also be disposed in the mobile communication device.

The optical character recognition module may be located on a remote server in communication with a mobile communication device. The reset procedure database may also be located on a remote server in communication with a mobile device.

The captured image may be an optical image of a vehicle's vehicle identification number, a vehicle's license plate number, or a bar code identification on the vehicle.

The system may further include a vehicle decoder module in communication with a vehicle diagnostic port for receiving information representative of a vehicle's vehicle identification number and converting the received information into a second data signal representative of the vehicle identifying information. The reset procedure database may be in communication with the vehicle decoder module for receiving the second data signal and accessing vehicle-specific diagnostic reset procedures associated with the vehicle identifying information identification from the plurality of diagnostic reset procedures. The vehicle decoder module may also be disposed in a mobile communication device, or remotely located.

According to another embodiment, there is provided a method of deriving and displaying vehicle-specific diagnostic reset procedures. The method includes capturing an optical image of vehicle identifying information; communicating the captured image to an optical character recognition module; converting the captured image into a data signal representative of the vehicle identifying information; communicating the data signal to a reset procedure database, wherein the reset procedure database stores a plurality of vehicle-specific diagnostic reset procedures; accessing diagnostic reset procedures associated with the vehicle identifying information from the plurality of vehicle-specific diagnostic reset procedures; and communicating the accessed diagnostic reset procedures from the reset procedure database to a display module; and displaying the accessed diagnostic reset procedures.

In another embodiment, there is provided a method of deriving and communicating diagnostic reset procedures to a vehicle diagnostic port in communication with a vehicle's electronic control unit. The method includes: communicating information representative of a vehicle's vehicle identification number from a vehicle diagnostic port to a vehicle decoder module; converting the received information into a data signal representative of the vehicle's vehicle identification number; communicating the data signal to a reset procedure database, wherein the reset procedure database stores a plurality of vehicle-specific diagnostic reset procedures; accessing diagnostic reset procedures associated with the vehicle's vehicle identification number from the plurality of vehicle-specific diagnostic reset procedures; communicating the accessed diagnostic reset procedures from the reset procedure database to the vehicle diagnostic port; and communicating the accessed diagnostic reset procedures received from the vehicle diagnostic port to a vehicle electronic control unit.

BRIEF DESCRIPTION OF THE DRAWINGS

Those as well as other features of the present invention will become more apparent upon reference to the drawings wherein.

Common reference numerals are used throughout the drawings and detailed descriptions to indicate like elements.

DETAILED DESCRIPTION

The detailed description set forth below is intended as a description of the presently preferred embodiment of the invention, and is not intended to represent the only form in which the present invention may be constructed or utilized. The description sets forth the functions and sequences of steps for constructing and operating the invention. It is to be understood, however, that the same or equivalent functions and sequences may be accomplished by different embodiments and that they are also intended to be encompassed within the scope of the invention.

Referring generally to the drawings, wherein the showings are for purposes of illustrating a preferred embodiment of the present invention only, and are not for purposes of limiting the same, there is shown a vehicle diagnostic device 10 for providing a vehicle 12 with a diagnostic reset procedure. As used herein, the term "diagnostic reset procedures" may include, but is not limited to, procedures for resetting diagnostic indicators integrated in a vehicle's electronic control unit, or located on a vehicle's dashboard, such as check-engine warning lights, battery replacement indicators, On-Board Diagnostics II monitor drive cycle reset indicators (OBDII Drive Cycle reset indicators), scheduled-service warning lights, control module memory indicators, odometer reset indicators, and oil level warning lights. These vehicle diagnostic indicators are exemplary and not designated to be a complete listing of the diagnostic reset procedures generated by the present invention.

The vehicle diagnostic device 10 uses vehicle identifying information, such as an optical image of a vehicle's vehicle identification number (VIN) 15 or license plate number 19, or information received from a vehicle's electronic control unit 47 that is representative of a vehicle's VIN 15, to generate a corresponding diagnostic reset procedure based on the vehicle identifying information. The corresponding diagnostic reset procedure may then be communicated to a mobile communication device 14, such as a smart phone, and presented on the mobile communication device's display module 30, thus allowing the user to read and manually execute the corresponding diagnostic reset procedures on the vehicle. Alternatively, the corresponding diagnostic reset procedures may be generated and communicated directly to the vehicle's electronic control unit (ECU) 47 for electronic implementation.

The vehicle diagnostic device 10 provides vehicle-specific, diagnostic reset procedures for drivers and mechanics in a highly efficient and accessible manner. For example, a vehicle has diagnostic indicators located on the vehicle's dashboard or integrated within the vehicle's ECU that correspond to different maintenance repairs or scheduled services the vehicle might need in the near future. Once a diagnostic indicator alerts a driver of a problem with the vehicle, the driver will take the vehicle to a repair shop to have the car serviced. After performing the necessary repairs or maintenance, the vehicle's diagnostic indicator will need to be reset, or have the memory stored within the vehicle's electronic control unit erased, so that the diagnostic indicator can alert the driver the next time the car requires maintenance. Using the present invention, a driver or mechanic can simply scan or take a picture of a vehicle's VIN, license plate number, or bar code identifier, or directly extract a vehicle's VIN or other vehicle identifying information from the vehicle's ECU. Thereafter, the device may proceed to autonomously identify the procedure necessary to reset a specific diagnostic indicator corresponding to the type of service or maintenance the car requires and display the selected reset procedure. Instead of displaying the reset procedure, or in addition thereto, the device may autonomously communicate the reset procedure to the vehicle. The device eliminates the need to parse through thick vehicle maintenance manuals, or search the internet, to identify the correct diagnostic reset procedure corresponding to a specific vehicle. Therefore, the device saves drivers and mechanics valuable time and money because the device minimizes the time a driver or mechanic needs to spend identifying the correct diagnostic reset procedure, thus allowing mechanics to move on to the next repair and drivers to continue about their day. In this regard, the vehicle diagnostic device has the potential to become a staple in the automotive maintenance and repair industry.

Figure 1:
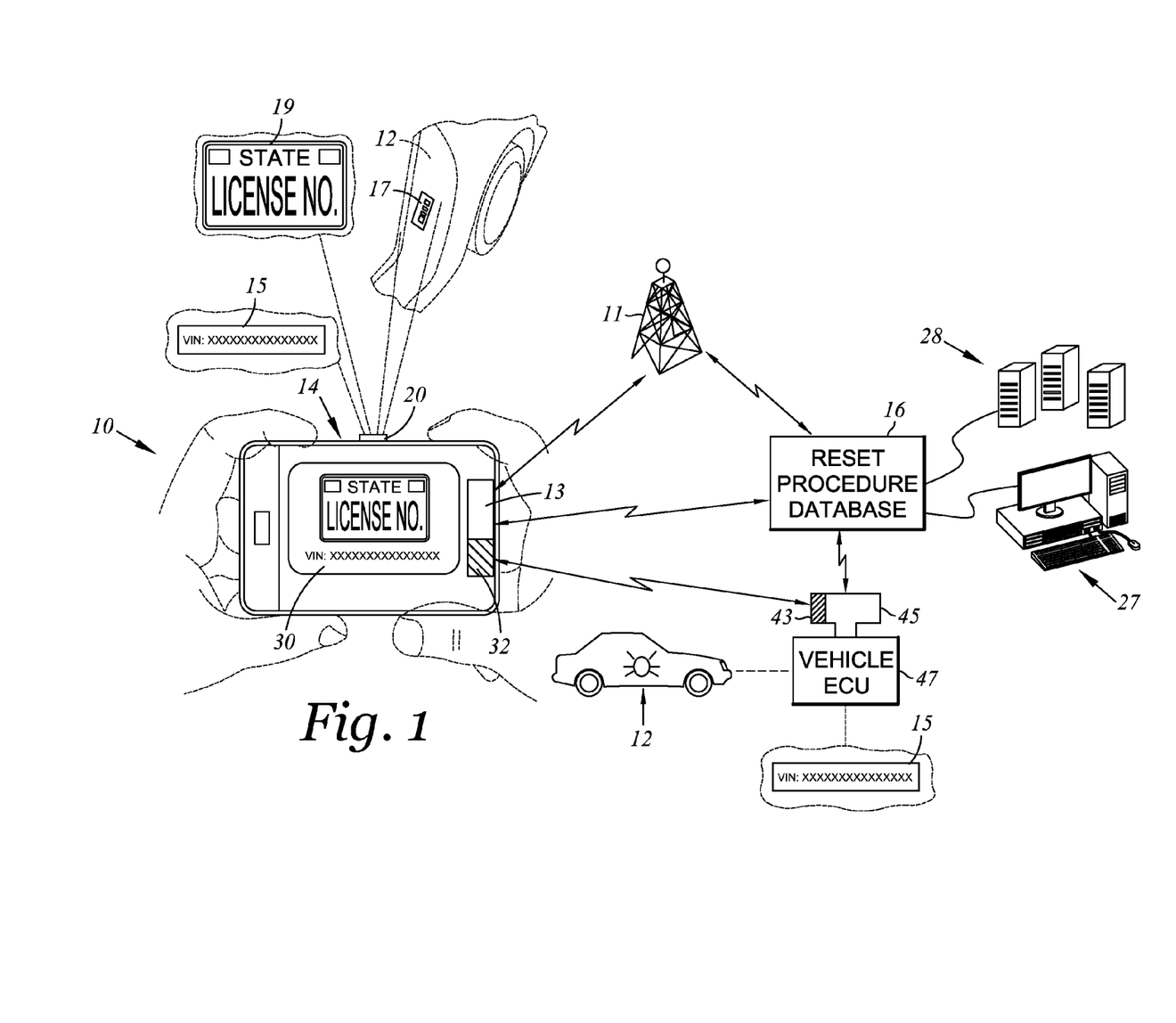
FIG. 1 is a schematic overview of an embodiment of the vehicle-specific diagnostic reset device wherein the optical character recognition module is disposed in the device and not shown.
Figure 2:
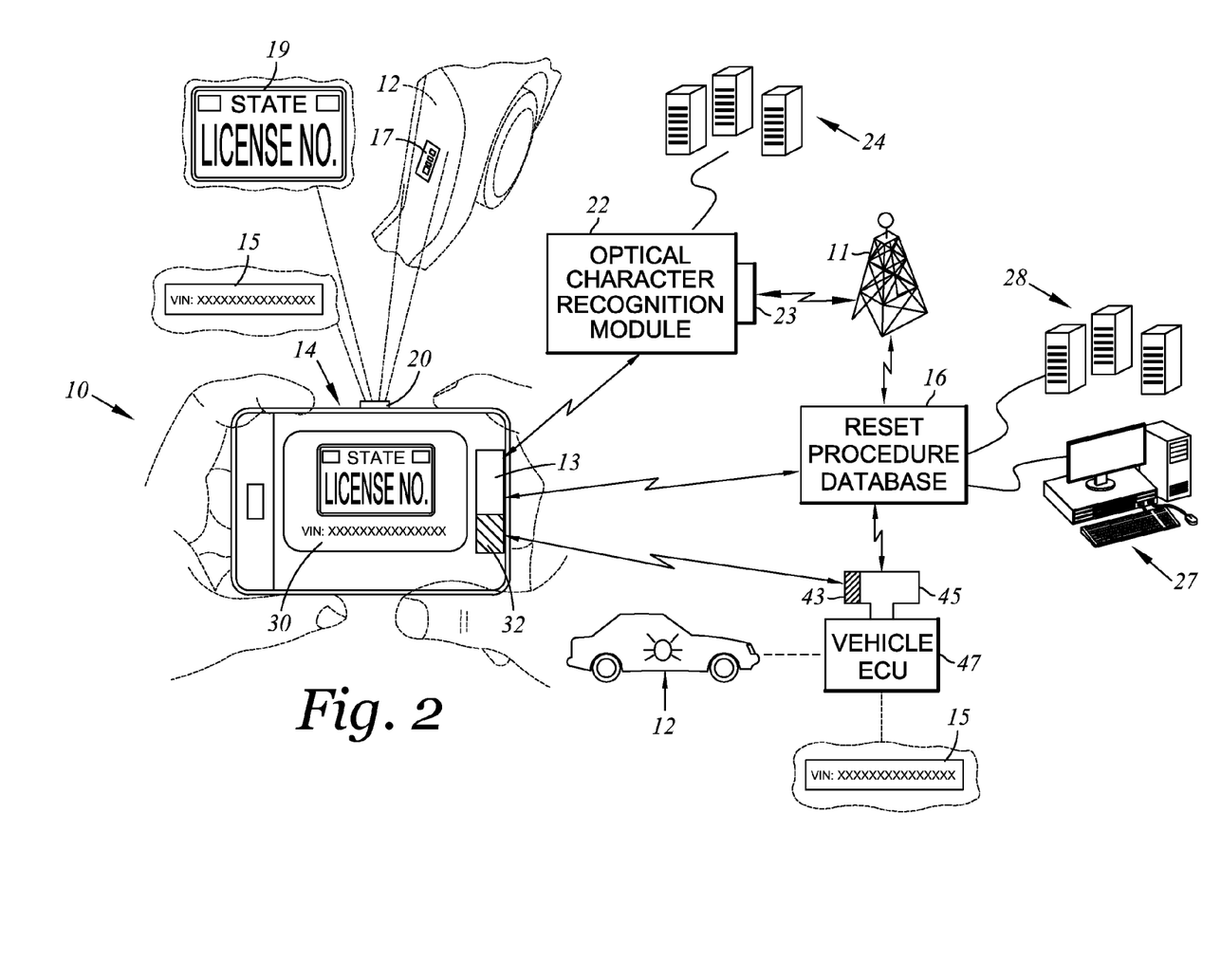
FIG. 2 is a schematic overview of an embodiment of the vehicle-specific diagnostic reset system wherein the optical character recognition module is located on a remote server in communication with a mobile communication device.

Referring now specifically to FIGS. 1-2, there is shown a first embodiment of the vehicle diagnostic device 10 which utilizes an image capturing device 20 to optically capture vehicle identifying information associated with the vehicle 12. As used herein, the term "image capturing device" may refer to a camera or scanner having the capability to capture an optical image. The image capturing device 20 is used to capture an image of vehicle identifying information associated with the vehicle, such as the VIN 15 or license plate 19. The VIN may be displayed in various locations throughout the vehicle, such as under the windshield or in the door panel. It is also contemplated that the VIN may be associated with a bar code 17 attached to the vehicle, and the image capturing device may capture an image of the bar code 17 or scan the bar code 17 to obtain the VIN or license plate number.

The vehicle diagnostic device 10 may also receive information representative of the vehicle's vehicle identification number 15 directly from the vehicle's ECU 47. More specifically, the vehicle diagnostic device may utilize a vehicle decoder module 32, which may be implemented as programming within the vehicle diagnostic device 10, to communicate with a vehicle diagnostic port 45 in communication with the vehicle's ECU 47. The vehicle decoder module 32 may receive information representative of a vehicle's vehicle identification number, or other vehicle identifying information, directly from the vehicle diagnostic port 45 connected to the vehicle's ECU 47 by using a universal serial bus (USB) cable (not shown), or a local wireless connectivity circuit 13, to extract the information representative of the vehicle's identification number from the vehicle diagnostic port 45.

After the image capturing device 20 captures an optical image of the vehicle identifying information, the captured image is communicated to an optical character recognition module 22, which may be implemented as programming within the vehicle diagnostic device 10 (internal optical character recognition module not shown in FIG. 1), or as a separate module located on a remote server 24 in communication with the vehicle diagnostic device 10 (see FIG. 2). The optical character recognition module 22 functions to convert the captured image into a data signal representative of the vehicle identifying information. The optical character recognition module 22 may extract or derive information based on an optical image of the vehicle's VIN 15, license plate number 19, or bar code image. For instance, the optical character recognition module 22 may identify the specific alphanumeric characters included in the image of the VIN 15 or license plate number 19, which in turn may be converted into a data signal representative of vehicle identifying information. The data signal representative of the vehicle identifying information may include, but is not limited to, information representative of the vehicle's year, make, model, and engine type.

Similarly, after the vehicle decoder module 32 receives vehicle identifying information, e.g. information representative of the vehicle's VIN 15, directly from the vehicle diagnostic port 45 connected to the vehicle's ECU 47, the vehicle decoder module 32 converts the image into a data signal representative of the vehicle's VIN 15. The vehicle decoder module 32 may extract or derive information representative of the vehicle's VIN 15 from the vehicle's diagnostic port 45. The vehicle decoder 32 module may then convert the received information into vehicle identifying information, which may include, but is not limited to, information representative of the vehicle's year, make, model, and engine type.

The optical character recognition module includes 22 includes an input/output port 23 for communicating to a reset procedure database 16 the data signal that was converted from the optical image of vehicle identifying information. Similarly, the vehicle decoder module is also configured to communicate to the reset procedure database 16 the data signal representative of information received from the vehicle's ECU 47. The reset procedure database 16 stores diagnostic reset procedures for a plurality of different vehicles and is operative to access diagnostic reset procedures associated with both the data signal representative of vehicle identifying information communicated from the optical character recognition module 22, and/or the data signal representative of the vehicle's VIN 15 communicated from the vehicle decoder module 32. For instance, the diagnostic reset procedure relating to resetting a scheduled-service warning light for a 2008 HONDA ACCORD® may differ from the reset procedure for a 2008 TOYOTA CAMRY®. Thus, the diagnostic reset procedures may be vehicle-specific, depending on the year, make, model, engine type of the user's vehicle. The diagnostic reset procedures stored in the reset procedure database 16 may be derived from vehicle-specific maintenance manuals related to resetting diagnostic indicators located on the vehicle's dashboard, or integrated within the vehicle's electronic control unit 47.

The image capturing device 20, the optical character recognition module 22, and the vehicle decoder module 32 may be disposed in a mobile communication device 14. The image capturing device 20 may be located on the surface of the mobile communication device 14, while the optical character recognition module 22 and the vehicle decoder module 32 may be a set of computer executable instructions (i.e., a smart phone application or app.) downloadable onto the mobile communication device 14 (internal optical character recognition module not shown in FIG. 1). Alternatively, the optical character recognition module 22 may be located on a remote server 24 in communication with the mobile communication device 14 via a local wireless connectivity circuit 13 located within the mobile communication device 14 (See FIG. 2). As used herein, the term "mobile communication device" may refer to a handheld electronic device, such as a smart phone, having an input, a display and the capability of communicating over a wireless communication network. Exemplary smart phones include the Apple iPhone®, the RIM Blackberry®, and the Galaxy Nexus®. It is also contemplated that the term "mobile communication device" may encompass tablet computers, such as the Apple iPad® or the Microsoft Surface®, or other handheld electronic devices known by those skilled in the art, such as scan tools. By using a mobile communication device 14, such as a smart phone, it is also contemplated that vehicle identifying information, such as a vehicle's VIN 15 or license plate number 19, may be manually communicated to the vehicle decoder module 32 by inputting the numbers via the mobile communication device's input functionality.

Figure 3:
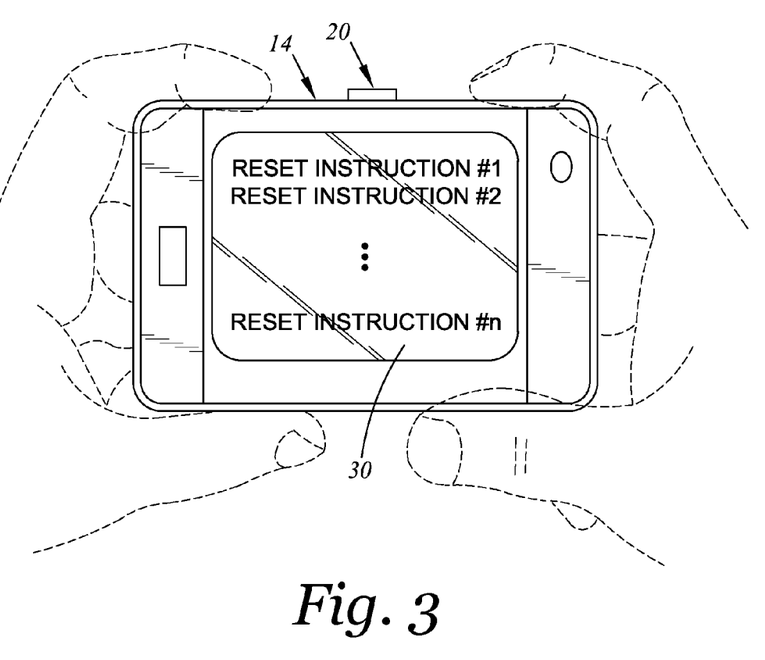
FIG. 3 is a schematic overview of the vehicle-specific diagnostic light reset device displaying a series of reset procedure instructions.
Figure 4:
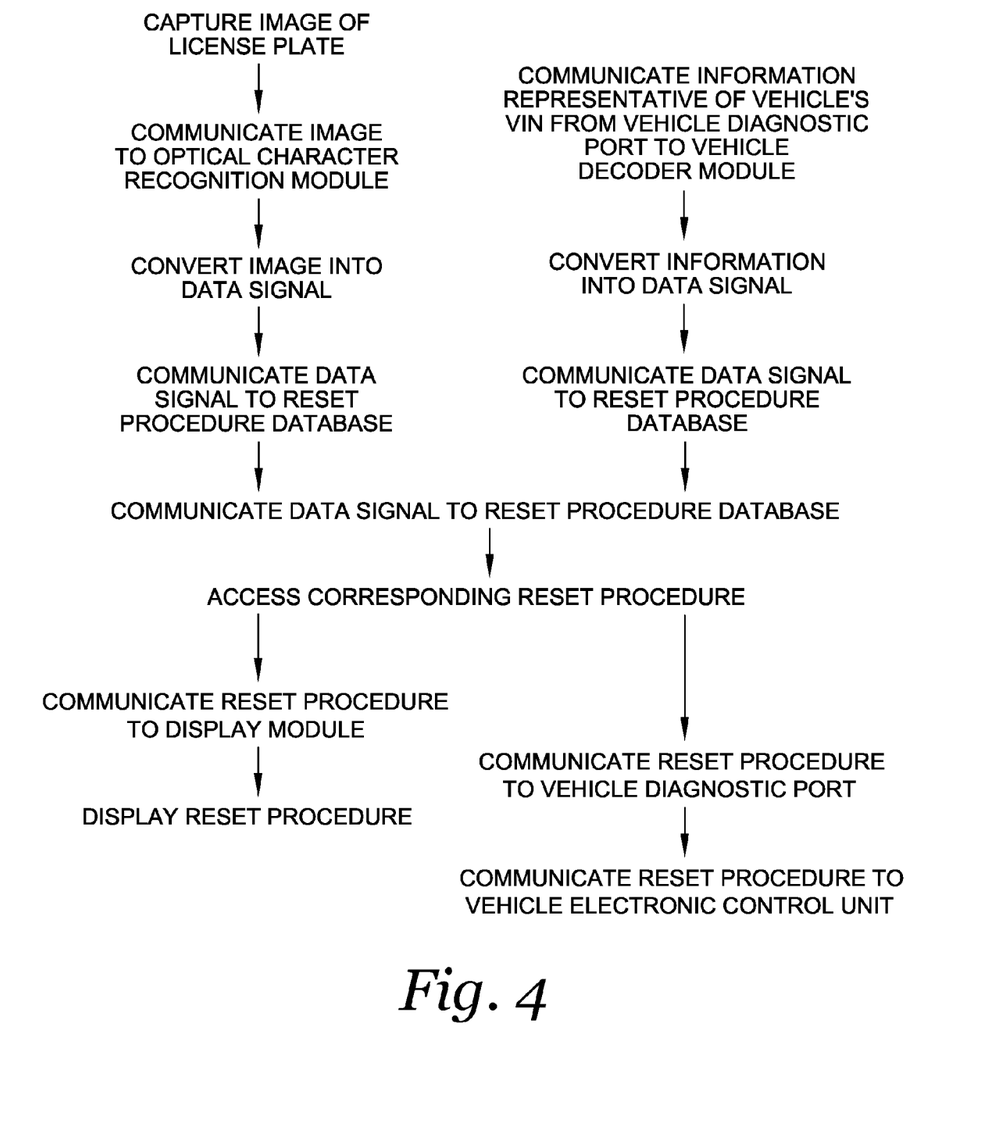
FIG. 4 is a flowchart providing two embodiments of a method for providing a vehicle with vehicle-specific diagnostic reset procedures.

According to one embodiment, the reset procedure accessed from the reset procedure database can be communicated and displayed on the mobile communication device's display module 30 (See FIGS. 1-2) via the local wireless connectivity circuit 13 located within the mobile communication device 14. In this embodiment, the corresponding diagnostic reset procedures contain instructions which may be presented on the display module 30, thus informing the user how to manually reset a vehicle-specific diagnostic indicator. For example, the diagnostic reset procedure instruction sequence may consist of: "First, turn the key to the '2' position. Second, turn the key to the 'off' position, and push and hold in the odometer reset button. Third, while still holding in the odometer reset button, turn the key back to the '2' position. Fourth, wait about 10-15 seconds until the warning light turns off." The diagnostic reset procedures may be presented singularly, wherein one instruction is displayed at a time, or completely, wherein all of the instructions are displayed in a complete list (See FIG. 3). Once the diagnostic reset procedures are displayed, the user may take appropriate action to implement the reset procedure. Those skilled in the art will readily appreciate that the instructions presented above are exemplary in nature only and are not intended to limit the scope of the present invention. In this embodiment, the optical character recognition module input/output port 23 may, for example, communicate with the reset procedure database via a cellular telephone network 11 accessible by the mobile communication device 14. Similarly, the vehicle decoder module may, for example, communicate with the reset procedure database via the local wireless connectivity circuit 13 accessible by the mobile communication device 14.

In another embodiment the diagnostic reset procedures accessed from the reset procedure database 16 may be communicated to a vehicle diagnostic port 45 connected to the vehicle's electronic control unit (ECU) 47. The diagnostic port 45 thus serves as an interface for communication between the vehicle diagnostic device 10 and a vehicle's ECU 47. The diagnostic port 45 may have a built-in wireless communication circuit (not shown), or alternatively, the diagnostic port 45 may be configured to be connectable to a wireless communication dongle, or adapter, 43. In this way the vehicle diagnostic port 45 may receive the accessed diagnostic reset procedures from the vehicle diagnostic device 10 via communication between the wireless connectivity circuits 13, 43, or receive the accessed diagnostic reset procedures directly from the reset procedure database 16. In one embodiment, the vehicle diagnostic port 45 then may communicate the accessed diagnostic reset procedures to the ECU 47. In this embodiment, the accessed diagnostic reset procedures may be communicated as coded instructions in the form of a multiplexed data signal that allows the ECU 47 to receive the accessed diagnostic reset procedures from the vehicle diagnostic port 45 and electronically reset corresponding diagnostic indicators integrated within the ECU 47. In one embodiment, the optical character recognition module input/output port 23 may, for example, communicate with the reset procedure database via a cellular telephone network 11 accessible by the mobile communication device 14. Similarly, the vehicle decoder module may, for example, communicate with the reset procedure database via the local wireless connectivity circuit 13 accessible by the mobile communication device 14.

The reset procedure database 16 may be located remotely from the smart phone 14. It is contemplated that the reset procedure database 16 may store vast amounts of data and require routine updating, and thus it may be beneficial to have the reset procedure database located remotely from the mobile communication device 14, which may not have the internal capacity to store such large amounts of data. The reset procedure database 16 may have access to one or more databases having stored vehicle identifying information correlated with vehicle identification numbers or license plate numbers. Therefore, the reset procedure database may be located on a server 28, computer 27, or other remote computing device, to achieve the internal capacity necessary to store the vast amount of data.

FIG. 5 is a flow chart representing the method by which the vehicle diagnostic derives vehicle-specific diagnostic reset procedures associated with vehicle identifying information, and subsequently communicates the generated diagnostic reset procedures to a mobile communication device 14, or, alternatively, to a vehicle diagnostic port 45 connected to a vehicle's electronic control unit 47.

Additional modifications and improvements of the present invention may also be apparent to those of ordinary skill in the art. Thus, the particular combination of components and steps described and illustrated herein is intended to represent only certain embodiments of the present invention, and is not intended to serve as limitations of alternative devices and methods within the spirit and scope of the invention.

What is claimed is:

1. A vehicle diagnostic device for deriving and displaying vehicle-specific diagnostic reset procedures, the device comprising:
   an image capturing device for capturing an optical image of vehicle data;
   an optical character recognition module in communication with the image capturing device for converting the captured image into a first data signal representative of the captured image;
   a vehicle decoder module in communication with the optical character recognition module for receiving and converting the first data signal into vehicle identifying information;
   the vehicle decoder module further being in communication with a reset procedure database for communicating the vehicle identifying information to the reset procedure database for accessing diagnostic reset procedures associated with the vehicle identifying information; and
   a display module in communication with the reset procedure database for displaying the diagnostic reset procedures accessed from the reset procedure database.

2. The device recited in claim 1, wherein the image capturing device is a camera.

3. The device recited in claim 2, wherein the camera, the optical character recognition module, and the display module are disposed in a mobile communication device.

4. The device recited in claim 1, wherein the captured image is an optical image of one of a vehicle identification number and a license plate number.

5. The device as recited in claim 4, wherein the captured image is an optical image of a bar code image representative of a vehicle identification number.

6. The device recited in claim 4, wherein the vehicle identifying information includes vehicle year, make, model, and engine information.

7. A vehicle diagnostic device for deriving and communicating vehicle-specific diagnostic reset procedures to a vehicle diagnostic port in communication with a vehicle's electronic control unit, the device comprising:
   an image capturing device for capturing an optical image of vehicle data;
   an optical character recognition module in communication with the image capturing device for converting the captured image into a first data signal;
   a vehicle decoder module in communication with the optical character recognition module for converting the first data signal into vehicle identifying information;
   the vehicle decoder module being in communication with a reset procedure database for communicating the vehicle identifying information to the reset procedure database for accessing a diagnostic reset procedure associated with the vehicle's vehicle identification number; and
   a local wireless communication circuit in communication with the reset procedure database for receiving the reset procedure and communicating the reset procedure to a vehicle diagnostic port.

8. The device as recited in claim 7 further including a display module in communication with the reset procedure database for displaying the diagnostic reset procedures accessed from the reset procedure database.

9. A system for deriving and displaying vehicle-specific diagnostic reset procedures on a vehicle diagnostic device, the system comprising:
   an image capturing device configured to capture an optical image of vehicle data;
   an optical character recognition module in communication with the image capturing device for converting the captured image into a first data signal representative of the captured image;
   a vehicle decoder module in communication with the optical character recognition module for converting the first data signal into vehicle identifying information;
   a reset procedure database in communication with the vehicle decoder module for receiving the vehicle identifying information, wherein the reset procedure database stores a plurality of vehicle-specific diagnostic reset procedures, and is operative to access a diagnostic reset procedure associated with the vehicle identifying information; and
   a display module in communication with the reset procedure database for displaying the diagnostic reset procedures accessed from the reset procedure database.

10. The system as recited in claim 9, wherein the optical character recognition module is disposed on a remote server.

11. The system as recited in claim 9, wherein the reset procedure database is disposed on a remote server.

12. The system as recited in claim 9, wherein the captured image is an optical image of one of a vehicle's vehicle identification number and a vehicle's license plate number.

13. The system as recited in claim 9, wherein the reset procedure database being in communication with the vehicle decoder module for accessing vehicle-specific diagnostic reset procedures associated with the vehicle identifying identification number from the plurality of diagnostic reset procedures.

14. The system as recited in claim 9, wherein the camera, the optical character recognition module, and the display module are disposed in a mobile communication device.

15. A system for deriving and communicating vehicle-specific diagnostic reset procedures to a vehicle diagnostic port in communication with a vehicle's electronic control unit, the system comprising:
- an image capturing device configured to capture an optical image of vehicle identifying information;
- an optical character recognition module in communication with the image capturing device, wherein the optical character recognition module is configured to convert the captured image into a first data signal representative of the vehicle identifying information;
- a reset procedure database in communication with the optical character recognition module for receiving the first data signal, wherein the reset procedure database stores a plurality of vehicle-specific diagnostic reset procedures, and is operative to access a vehicle specific diagnostic reset procedure associated with the vehicle identifying information from the plurality of diagnostic reset procedures; and
- a local wireless connectivity circuit is in communication with the vehicle diagnostics port and the reset procedure database for communicating the vehicle specific diagnostic reset procedure to the diagnostic port.

16. The system recited in claim 15, further comprising:
- a vehicle decoder module in communication with the vehicle diagnostic port for receiving information representative of a vehicle's vehicle identification number and converting the received information into a second data signal representative of the vehicle's vehicle identification information;
- the reset procedure database being in communication with the vehicle decoder module for receiving the second data signal and accessing vehicle-specific diagnostic reset procedures associated with the vehicle's vehicle identification number from the plurality of diagnostic reset procedures.

17. The system recited in claim 16, wherein the vehicle decoder module is disposed in a mobile communication device.

18. A method of deriving and displaying vehicle-specific diagnostic reset procedures, the method comprising the steps of:
- capturing an optical image of vehicle identifying information;
- communicating the captured image to an optical character recognition module;
- converting the captured image into a data signal representative of the vehicle identifying information;
- communicating the data signal to a reset procedure database, wherein the reset procedure database stores a plurality of vehicle-specific diagnostic reset procedures;
- accessing a diagnostic reset procedure associated with the vehicle identifying information from the plurality of vehicle-specific diagnostic reset procedures;
- communicating the accessed diagnostic reset procedure from the reset procedure database to a display module; and
- communicating the accessed diagnostic reset procedure to an electronic control unit associated with the vehicle.

19. The method recited in claim 18, wherein capturing an optical image step includes capturing an image of one of a vehicle's vehicle identification number, a vehicle's bar code identifier, and a vehicle's license plate number.

20. The method as recited in claim 18, wherein the vehicle decoder module is disposed in a mobile communication device.

21. A method of deriving and communicating diagnostic reset procedures to a vehicle diagnostic port in communication with a vehicle's electronic control unit, the method comprising the steps of:
- receiving vehicle identifying information from a vehicle diagnostic port;
- converting the received information into a data signal representative of the vehicle identifying information;
- communicating the data signal to a reset procedure database, wherein the reset procedure database stores a plurality of vehicle-specific diagnostic reset procedures;
- accessing a diagnostic reset procedure associated with the vehicle's vehicle identification number from the plurality of vehicle-specific diagnostic reset procedures;
- communicating the accessed diagnostic reset procedures from the reset procedure database to the vehicle diagnostic port; and
- communicating the accessed diagnostic reset procedures received from the vehicle diagnostic port to the electronic control unit.

* * * * *